(12) United States Patent
Lai

(10) Patent No.: US 8,432,378 B2
(45) Date of Patent: Apr. 30, 2013

(54) TOUCH PANEL DISPLAY WITH LIGHT SOURCE MODULES AND CAMERA FOR TOUCH POINT DETECTION

(75) Inventor: Cheng-Yi Lai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 760 days.

(21) Appl. No.: 12/635,857

(22) Filed: Dec. 11, 2009

(65) Prior Publication Data

US 2010/0265215 A1 Oct. 21, 2010

(30) Foreign Application Priority Data

Apr. 21, 2009 (CN) .......................... 2009 1 0301727

(51) Int. Cl.
*G06F 3/042* (2006.01)
(52) U.S. Cl.
USPC .......................................................... 345/175
(58) Field of Classification Search .................. None
See application file for complete search history.

(56) References Cited

U.S. PATENT DOCUMENTS

| 5,506,929 | A  | * | 4/1996  | Tai et al. ........................ 385/146 |
| 6,803,900 | B1 | * | 10/2004 | Berkoff et al. ................. 345/102 |
| 6,972,753 | B1 |   | 12/2005 | Kimura et al. |
| 7,465,914 | B2 | * | 12/2008 | Eliasson et al. ................ 250/221 |
| 7,629,967 | B2 | * | 12/2009 | Newton ........................ 345/173 |
| 8,022,941 | B2 | * | 9/2011  | Smoot ............................ 345/175 |
| 2009/0284968 | A1 | * | 11/2009 | Kuo et al. ..................... 362/235 |

FOREIGN PATENT DOCUMENTS

CN 2884256 Y 3/2007

* cited by examiner

*Primary Examiner* — Jason Olson
(74) *Attorney, Agent, or Firm* — Altis Law Group, Inc.

(57) ABSTRACT

An exemplary touch panel display includes a display panel, light source modules, and a camera. The display panel includes a touch surface. The light source modules are disposed on a periphery of the display panel. Light from the light source modules cooperatively forms a substantially planar illumination field. The camera is provided at a periphery of the display panel. When an object contacts or is adjacent to the touch surface, some of the light of the illumination field is reflected by the object to the camera.

5 Claims, 6 Drawing Sheets

TOUCH PANEL DISPLAY WITH LIGHT SOURCE MODULES AND CAMERA FOR TOUCH POINT DETECTION

BACKGROUND

1. Technical Field

The present disclosure relates to a touch panel display which includes light source modules and a camera arranged in a frame of a display screen, thereby cooperatively detecting a position of an object when the object contacts or is adjacent to the display screen.

2. Description of Related Art

A touch panel can be incorporated into devices such as a thin film transistor (TFT) liquid crystal display (LCD). A typical TFT LCD includes a pair of glass substrates separated by a layer of liquid crystal material. Commonly used types of touch panels include resistive touch panels and capacitive touch panels.

In a typical touch panel display, a touch panel is employed on a whole surface of one of the glass substrates of an LCD. However, such arrangement inevitably increases the thickness and weight of the overall display unit. Furthermore, the light penetration and the brightness of the display provided by the LCD may be attenuated by the touch panel.

Therefore, a touch panel display which can overcome the limitations described is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views, and all the views are schematic.

DETAILED DESCRIPTION

Various embodiments will now be described in detail below with reference to the drawings.

Figure 1:
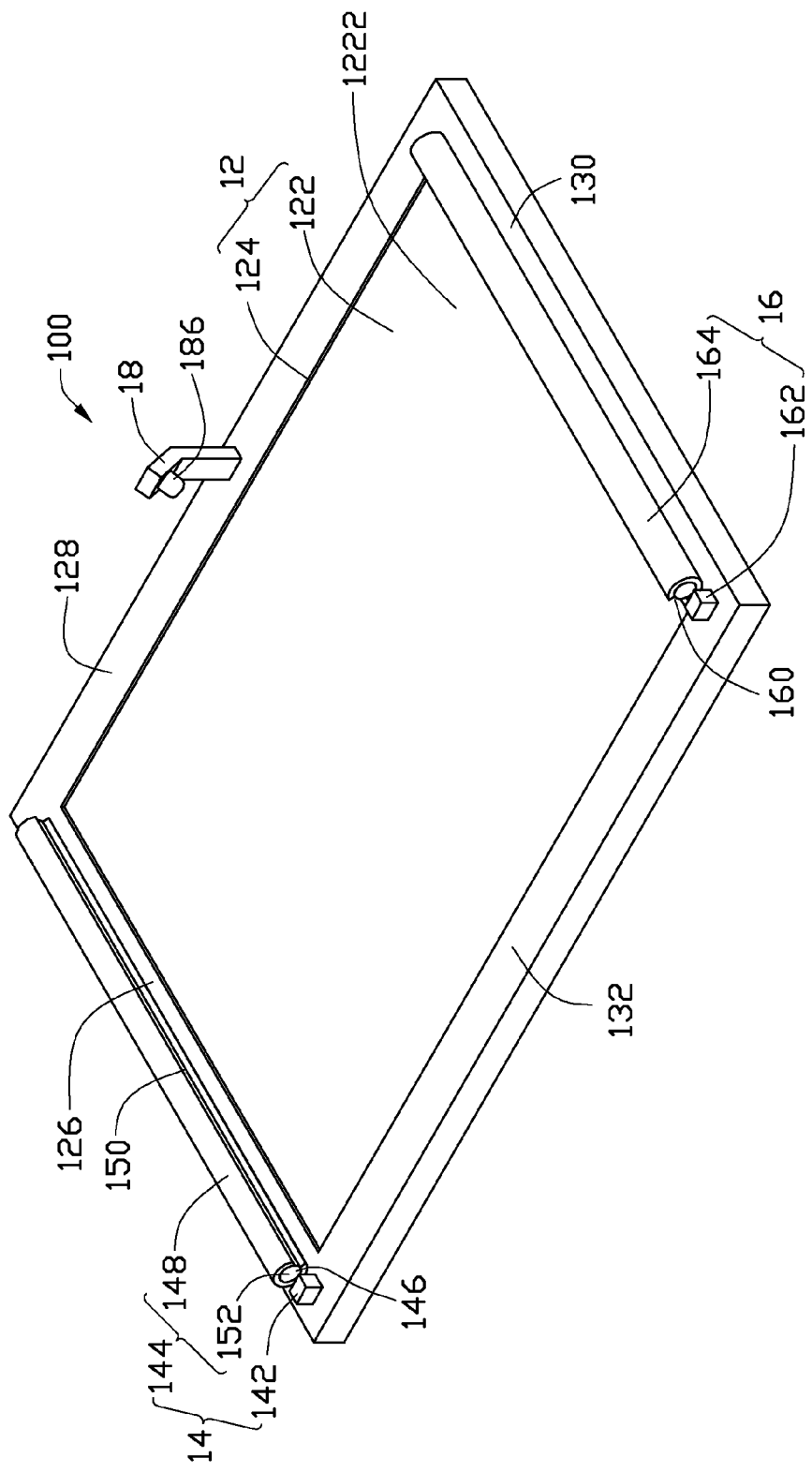
FIG. 1 is an isometric view of a touch panel display according to a first embodiment of the present disclosure.
Figure 2:
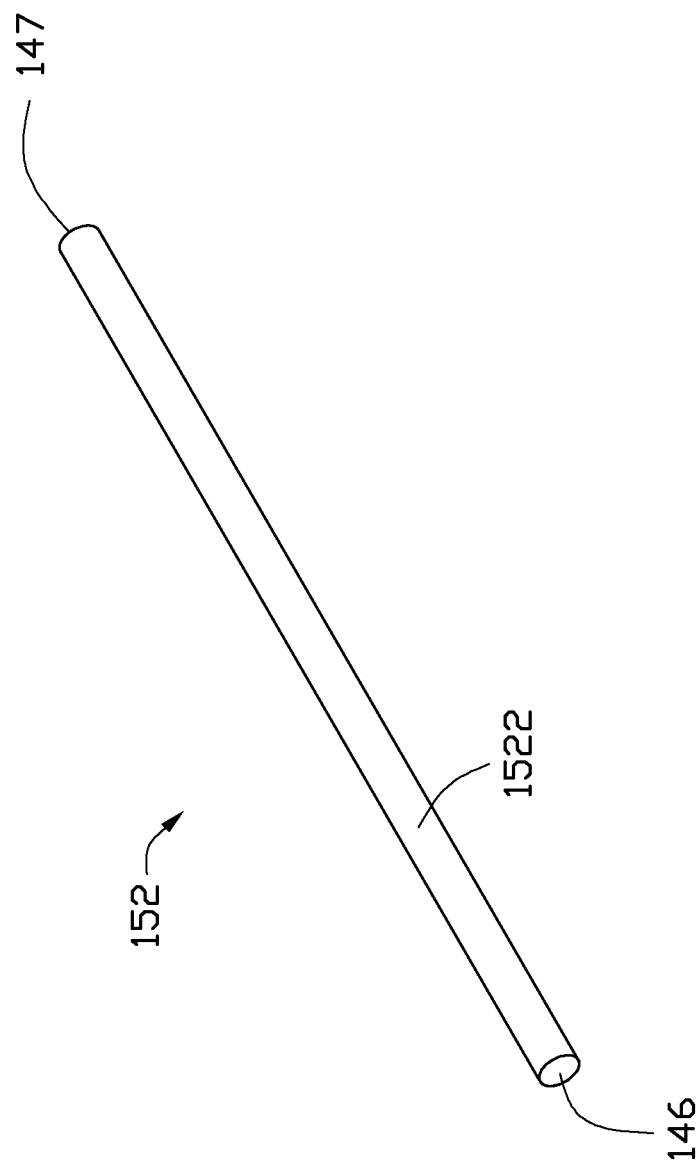
FIG. 2 is an enlarged view of a light guiding element light guide of the touch panel display of FIG. 1.

Referring to FIGS. 1-2, a touch panel display 100 according to a first embodiment is shown. The touch panel display 100 includes a display panel 12, two light source modules 14, 16, and a camera 18.

The display panel 12 includes a display screen 122, and a frame 124 surrounding the display screen 122. The display screen 122 includes a touch surface 1222. In the present embodiment, the touch surface 1222 is rectangular. The frame 124 includes four sides 126, 128, 130, and 132. In the present embodiment, the display panel 12 is an LCD panel. In alternative embodiments, the display panel 12 can be, for example, a field emission display (FED) panel, or a plasma display panel (PDP).

The two light source modules 14, 16 are configured as linear light sources, and are mounted on the two opposite sides 126 and 130 of the frame 124, respectively. The light source modules 14, 16 are similar to each other. The light source module 14 includes a point light source 142 and a light guiding member 144. In the present embodiment, the point light source 142 is an infrared (IR) LED. In alternative embodiments, the point light source 142 can be a light source for emitting visible light.

The light guiding member 144 includes a light guide 152 and a light reflective layer 148. In the present embodiment, the light guide 152 is a cylindrical, solid body of transparent material such as glass or polymer. The axis of the light guide 152 is substantially parallel to the side 126 of the frame 124. In the present embodiment, the length of the light guide 152 equals a length of an inner edge of the side 126 of the frame 124. In other embodiments, the length of the light guide 152 is larger than the length of the inner edge of the side 126 of the frame 124. The light guide 152 includes a cylindrical side wall 1522 and two opposite end surfaces 146, 147. The end surface 146 is adjacent to the point light source 142, and serves as a light incident surface.

The light reflective layer 148 is formed on the side wall 1522 and the end surface 147 of the light guide 152. The light guiding member 144 defines a light emitting portion 150 at the light reflective layer 148. In the present embodiment, the light emitting portion 150 is formed by a groove defined in the light reflective layer 148. In alternative embodiments, the light emitting portion 150 can be formed by providing a strip of transparent or light pervious material on the side wall 1522 of the light guide 152, with portions of the light reflective layer 148 surrounding and abutting the strip. The light emitting portion 150 extends along a direction parallel to the axis of the light guide 152. In the present embodiment, the length of the light emitting portion 150 exceeds or equals the length of the inner edge of the side 126 of the frame 124. The light emitting portion 150 faces the light source module 16.

Light from the point light source 142 passes through the end surface 146 into the light guide 152, is reflected by the light reflective layer 148, and then exits from the light emitting portion 150. The light exiting the light emitting portion 150 is substantially parallel to the touch surface 1222 of the display screen 122.

In alternative embodiments, the light guide 152 can be a column with a cross-sectional shape of, for example, an ellipse, a square or a polygon. In still other embodiments, the light guide 152 can be a hollow cylinder. In such cases, the light reflective layer 148 is formed on the inner side wall or the outer side wall of the light guide 152.

The light source module 16 includes a point light source 162 and a light guiding member 164. The light guiding member 164 defines a light emitting portion 160, which faces the light source module 14.

Figure 3:
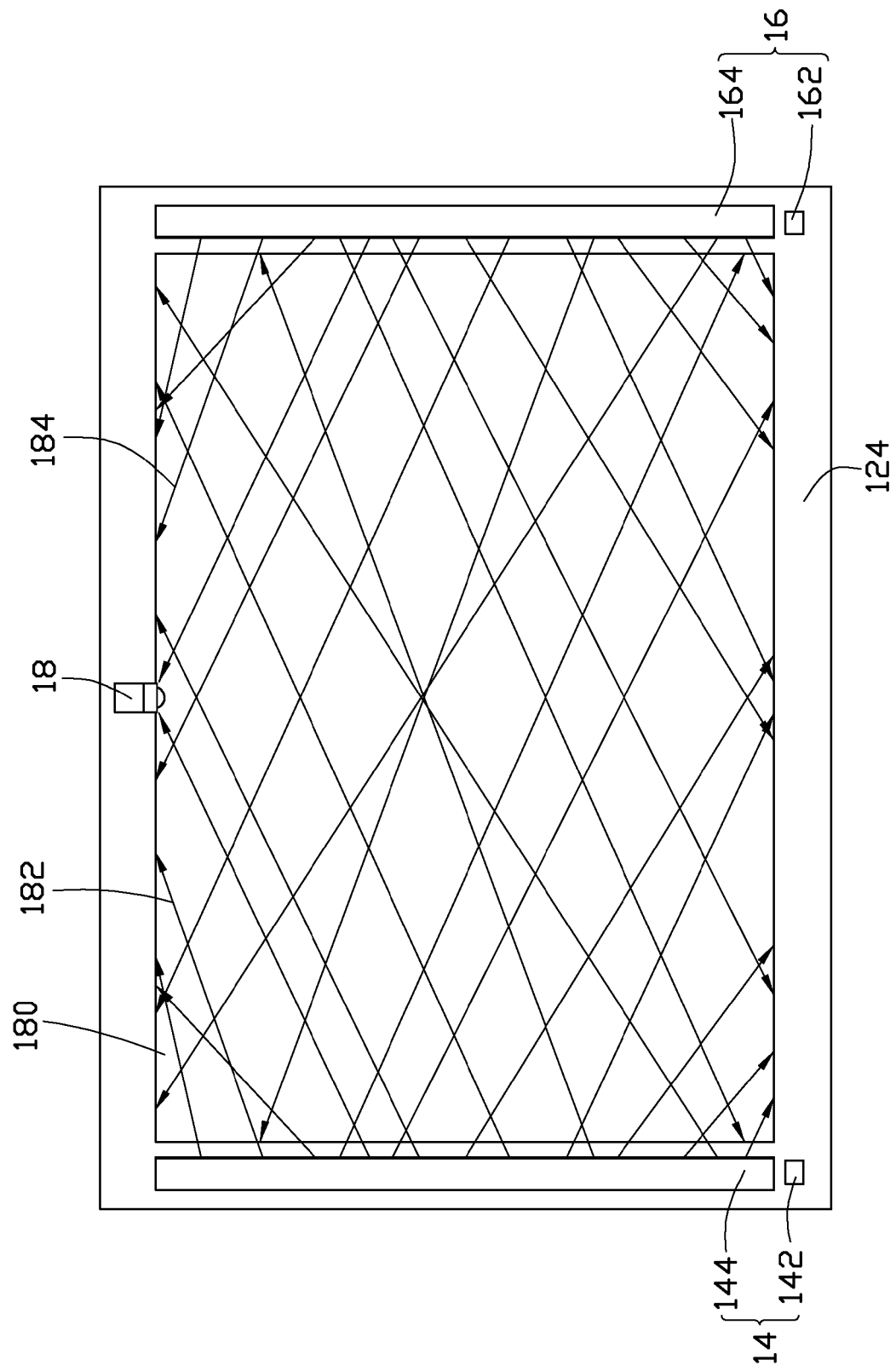
FIG. 3 is a top plan view of the touch panel display of FIG. 1, showing two light source modules of the touch panel display forming an illumination field.

Referring to FIG. 3, when light 182 from the point light source 142 exits the light emitting portion 150, and light 184 from the point light source 162 exits the light emitting portion 160, the light 182 and the light 184 cooperatively illuminate the entire touch surface 1222. That is, the light 182 and the light 184 cooperatively form a substantially planar illumination field 180. In FIG. 3, only certain exemplary components of the light 182 the light 184 are shown, to illustrate the nature of the formation of the whole illumination field 180. The plane of the illumination field 180 is substantially parallel to the touch surface 1222.

The camera 18 is disposed on the side 128 of the frame 124. A field of view of the camera 18 covers the entire touch surface 1222. The distance between a light entrance portion 186 of the camera 18 and the touch surface 1222 vertically is larger than the distance between the illumination field 180 and the touch surface 1222. When no object contacts or is adjacent to the touch surface 1222, the camera 18 receives no light from the light source module 14 and the light source module 16. When an object (not shown), for example, a user's finger or a stylus, contacts or is adjacent to the touch surface 1222, the object interrupts the illumination field 180 and some of the infrared light is reflected by the object to the camera 18. The camera 18 detects the reflected infrared light, and forms an image corresponding to an area of the touch surface 1222. The image includes a "bright spot" corresponding to the reflected infrared light, and such image is referred to herein as a "bright spot image." The bright spot in the image corresponds to the position of the object. A processor (not shown) compares the bright spot image to an original reference image of the area of the touch surface 1222, and can thereby obtain X,Y coordinates of the object relative to the touch surface 1222.

Figure 4:
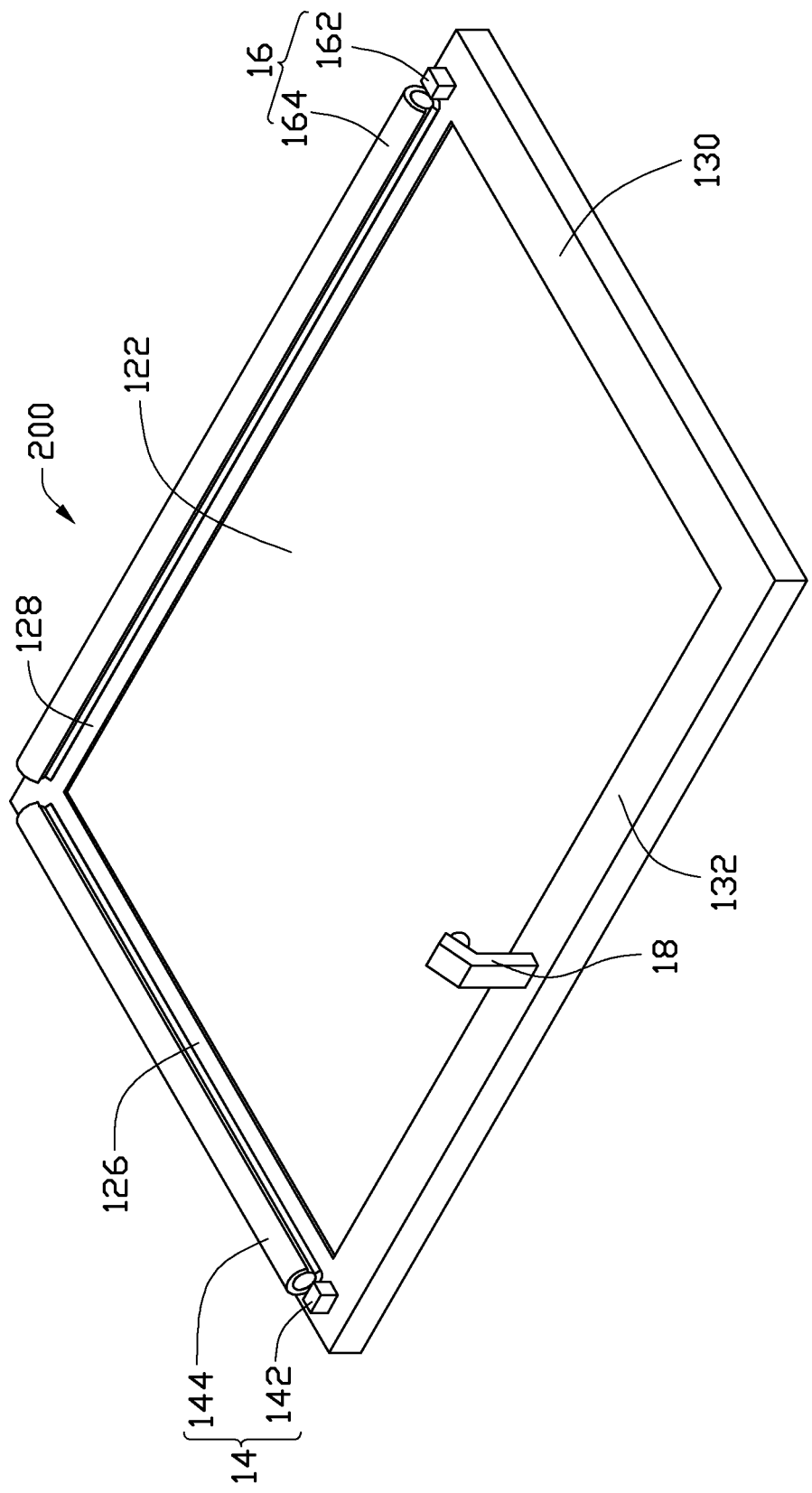
FIG. 4 is an isometric view of a touch panel display according to a second embodiment of the present disclosure.

Referring to FIG. 4, a touch panel display 200 according to a second embodiment is shown. The touch panel display 200 is similar to the touch panel display 100. However, in the touch panel display 200, the two light source modules 14 and 16 are disposed on the two adjacent sides 126, 128 of the frame 124. In particular, the light source module 16 is disposed on the side 128 of the frame 124. The light source member 164 of the light source module 16 has a length corresponding to the length of the side 128. The point light source 162 is positioned on a corner of the frame 124 diagonally opposite from the point light source 142. In addition, the camera 18 is disposed on the side 132 of the frame 124.

Figure 5:
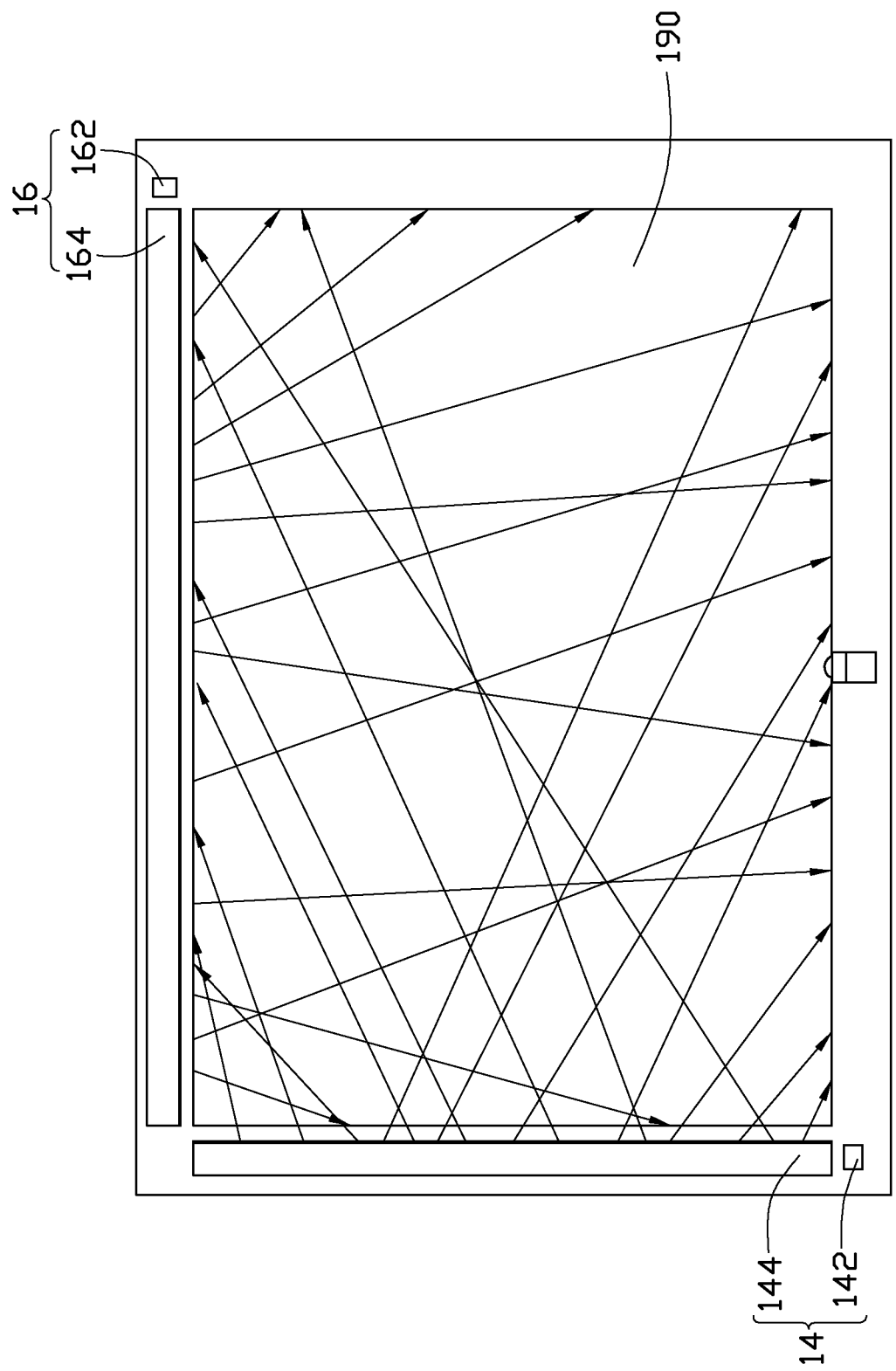
FIG. 5 is a top plan view of the touch panel display of FIG. 4, showing two light source modules of the touch panel display forming an illumination field.

Referring also to FIG. 5, the light from the light source module 14 and the light from the light source module 16 cooperatively form an illumination field 190.

It can be understood that in alternative embodiments, the numbers of light source modules 14, 16 are not limited to those disclosed in the present embodiments.

Figure 6:
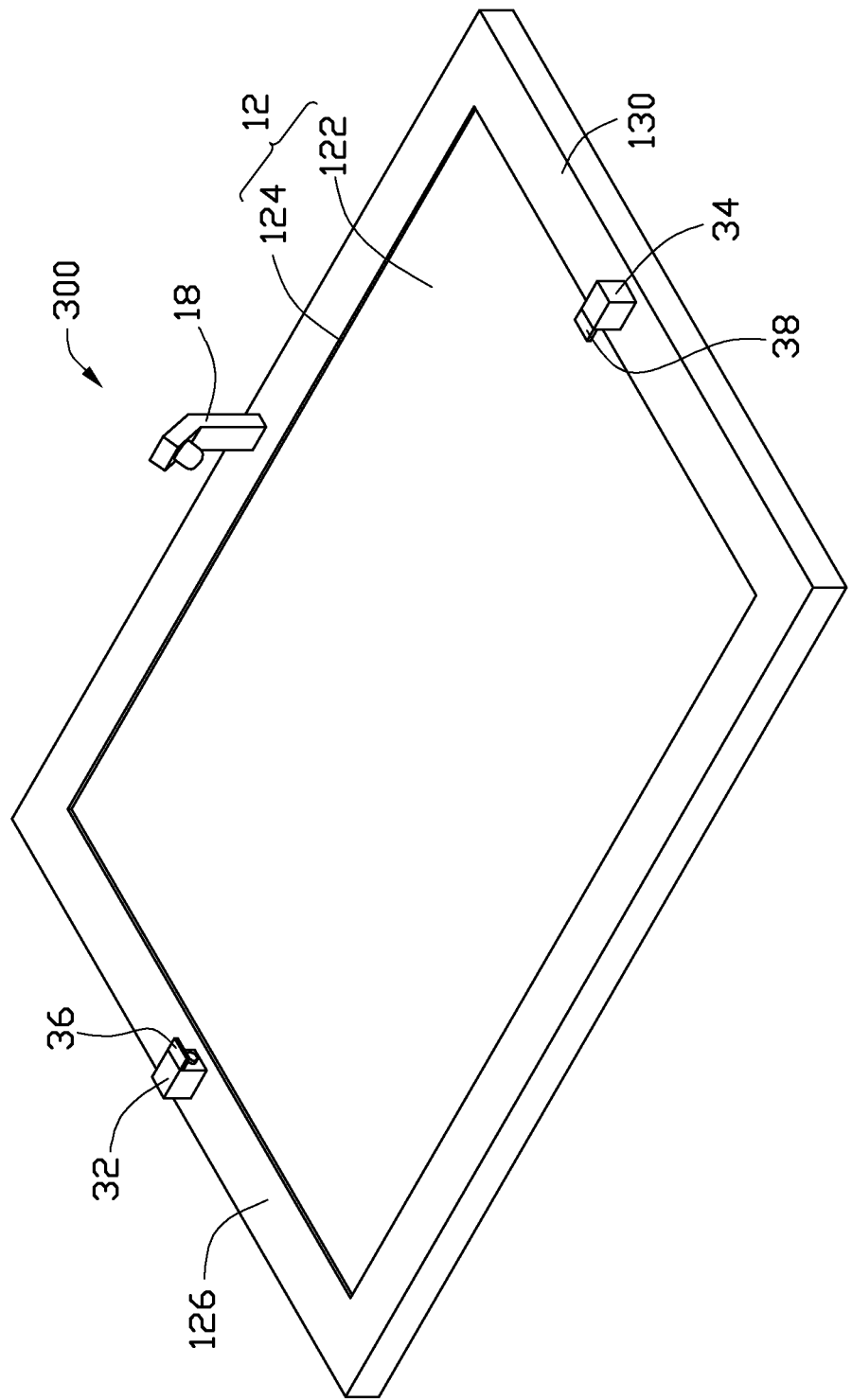
FIG. 6 is an isometric view of a touch panel display according to a third embodiment of the present disclosure.

Referring to FIG. 6, a touch panel display 300 according to a third embodiment is shown. The touch panel display 300 is similar in principle to the touch panel display 100. However, the touch panel display 300 employs two point light sources 32 and 34, rather than the two light source modules 14 and 16.

The point light source 32 is disposed at a center of the side 126 of the frame 124, and the point light source 34 is disposed at a center of the side 130 of the frame 124. The side 126 is substantially parallel to the side 130. In one embodiment, each of the point light sources 32, 34 is an LED, and preferably an LED with a lens package. Thus the direction and/or orientation of the illumination field cooperatively formed by the point light sources 32, 34 can be easily configured and adjusted. In the present embodiment, the illumination field is substantially planar, and substantially parallel to the touch surface 1222. The touch panel display 300 further includes two light shield plates 36, 38. The two light shield plates 36, 38 are mounted at the tops of the two point light sources 32 and 34, respectively. Each of the light shield plates 36, 38 is parallel to the touch surface 1222 of the display screen 122. The two light shield plates 36, 38 are used to ensure that no light emitted from the point light sources 32, 34 directly propagates to the camera 18. In the present embodiment, the bottom surface of each of the light shield plates 36, 38 can absorb light. It can be understood that the positions of the point light sources 32, 34 are not limited to those of the present embodiment.

In summary, each of the touch panel displays 100, 200 employs the two light source modules 14, 16 and the camera 18 disposed on the frame 124 to detect an object contacting or adjacent to the touch surface 1222. The touch panel display 300 employs the two point light sources 34, 36 and the camera 18 to detect an object contacting or adjacent to the touch surface 1222. Accordingly, no touch panel is required to be installed on a surface of the touch panel display 100, 200 or 300. Thus, the touch panel display 100, 200 or 300 can be compact and lightweight, with the display provided by the display panel 12 being unimpeded and having high brightness.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope and spirit of the appended claims.

The invention claimed is:

1. A touch panel display comprising:
   a display panel comprising a touch surface;
   a plurality of light source modules disposed on a periphery of the display panel, light from the light source modules cooperatively forming a substantially planar illumination field that is substantially positioned above and parallel to the touch surface; and
   a camera provided at a periphery of the display panel and positioned above the touch surface and the planar illumination field, wherein when an object contacts or is adjacent to the touch surface, some of the light of the illumination field is reflected by the object to the camera;
   wherein each of the light source modules comprises a point light source;
   wherein the touch panel display comprises a plurality of light shield plates positioned above the planar illumination filed but beneath the camera, the light shield plates are located above the light source modules, respectively, wherein each of the light shield plates is arranged to prevent light emitted from the corresponding point light source from propagating directly to the camera.

2. The touch panel display of claim 1, wherein a bottom surface of each of the light shield plates is configured for absorbing light.

3. The touch panel display of claim 1, wherein the display panel comprises a frame that has at least four sides, and two of the light source modules are disposed on two opposite sides of the frame, respectively.

4. The touch panel display of claim 1, wherein the display panel comprises a display screen and a frame surrounding the display screen, and the touch surface is defined on the display screen.

5. The touch panel display of claim 1, wherein the light from the light source modules is selected from the group consisting of infrared light and visible light.

* * * * *